United States Patent [19]

Dunn et al.

[11] Patent Number: 4,664,684

[45] Date of Patent: May 12, 1987

[54] AIR FILTER UNIT

[75] Inventors: Kinion H. Dunn, Algood; Michael L. Pack, Baxter; Sonja H. Holzhausen, Sparta, all of Tenn.

[73] Assignee: Cummins Engine Company, Inc., Columbus, Ind.

[21] Appl. No.: 824,068

[22] Filed: Jan. 30, 1986

[51] Int. Cl.[4] .............................................. B01D 46/10
[52] U.S. Cl. ...................................... 55/498; 55/525; 210/493.2
[58] Field of Search ................. 55/486, 487, 498, 500, 55/521, 525; 210/493.2, 497.01, 485; 29/163.5; 413/169, 72; 156/218

[56] References Cited

U.S. PATENT DOCUMENTS

| 846,482 | 3/1907 | Layne | 29/163.5 R |
| 3,399,516 | 9/1968 | Hough et al. | 55/487 |
| 3,764,425 | 10/1973 | Neff et al. | 156/218 |

FOREIGN PATENT DOCUMENTS

| 239807 | 9/1964 | Austria | 210/493.2 |
| 689575 | 4/1953 | United Kingdom | 210/493.2 |
| 2134811 | 8/1984 | United Kingdom | 210/493.2 |

*Primary Examiner*—Bernard Nozick
*Attorney, Agent, or Firm*—Neuman, Williams, Anderson & Olson

[57] ABSTRACT

An air filter unit is provided for use with an internal combustion engine. The unit includes inner and outer sleeves, a filter medium disposed intermediate the sleeves, and end plates affixed to and overlying the corresponding ends of the sleeves and filter medium. At least the outer sleeve is formed from a blank of foraminous, relatively stiff, sheet material with the periphery thereof including burr-forming peripheral portions and an elongated peripheral portion folded back upon itself to form a hem-like segment. The blank is then formed into a cylindrical sleeve with the hem-like segment overlapping and being affixed to a burr-forming peripheral portion opposite the hem-like segment so as to form an elongated seam extending the length of the sleeve. The overlapped seam-forming peripheral portion being exposed only on an interior surface of the sleeve.

5 Claims, 5 Drawing Figures

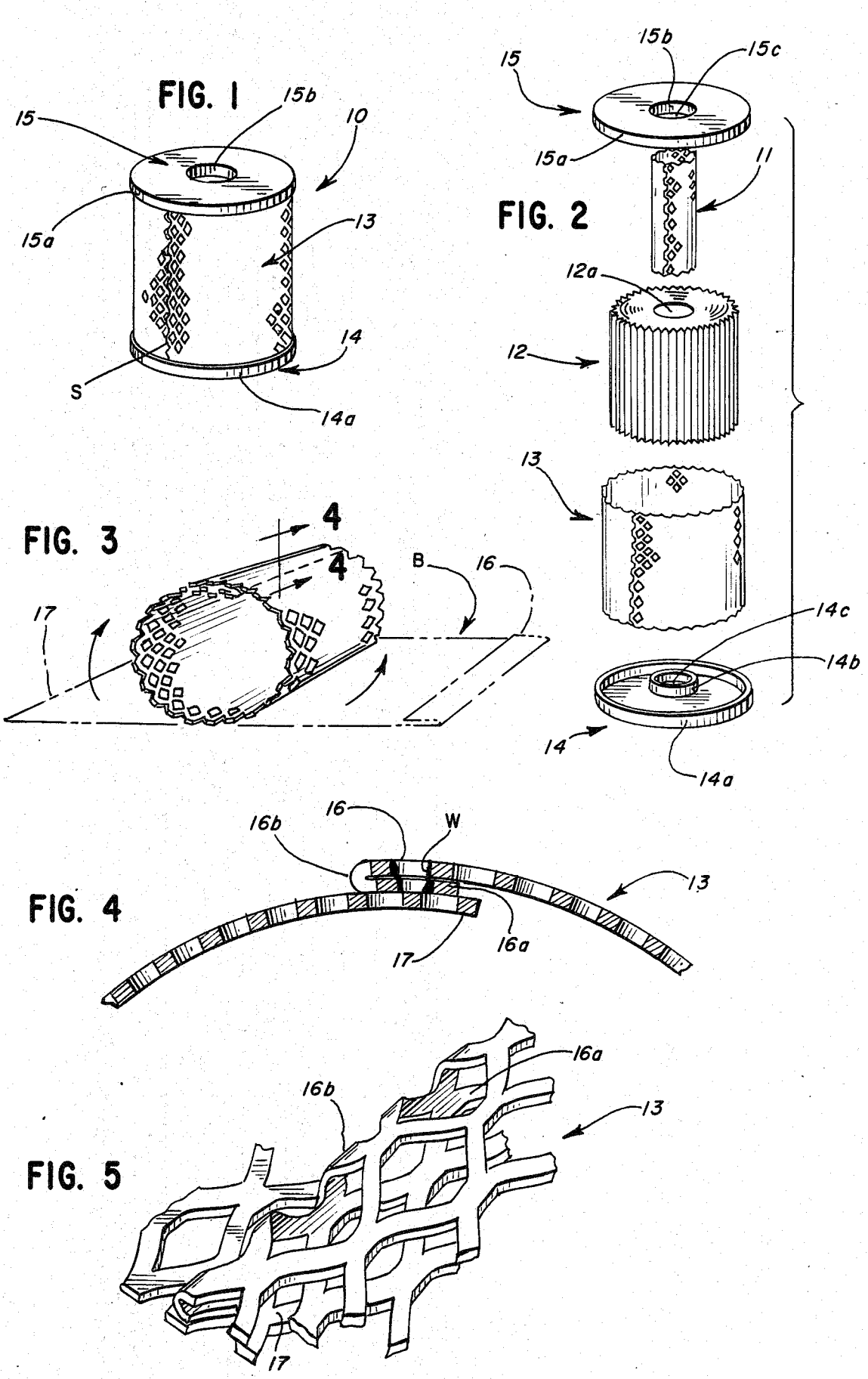

AIR FILTER UNIT

BACKGROUND OF THE INVENTION

Air filter units particularly those utilized with internal combustion engines for heavy duty trucks, and the like, normally include an outer sleeve which is formed from a blank of expanded metal or perforated sheet material which in turn, is formed into a cylindrical sleeve by a complex, time-consuming operation and/or in many instances a jagged, burr-forming edge of the blank is exposed when a seam is formed in the ultimate sleeve. Such an exposed edge is susceptible to being snagged by clothing or the like or scratching or cutting the hands or arms of the installer when the filter unit is being installed on or removed from the engine or when the components of the filter unit are being assembled.

SUMMARY OF THE INVENTION

Thus, it is an object of the invention to provide an air filter unit which is of simple, inexpensive, yet sturdy construction.

It is a further object to provide an air filter unit wherein there are no exposed jagged, burr-forming edge portions.

Further and additional objects will appear from the description, accompanying drawing and appended claims.

In accordance with one embodiment of the invention, an air filter unit is provided which includes inner and outer cylindrical sleeves, a filter medium disposed between the sleeves, and a pair of end plates affixed to and overlying the corresponding ends of the sleeves and filter medium. At least the outer sleeve is formed from a blank of foraminous, relatively stiff sheet material with the periphery thereof including jagged, burr-forming peripheral portions and an elongated peripheral portion folded back upon itself to form a hem-like segment. The hem-like segment overlaps and is affixed to a jagged, burr-forming peripheral portion opposite the hem-like segment and thus, forms an elongated seam extending the length of the sleeve with the folded back portion concealed. The jagged, burr-forming peripheral portions of the blank which form the sleeve ends are concealed by the corresponding end plates. The overlapped seam-forming peripheral portion of the blank is exposed only on an interior surface of the outer sleeve.

DESCRIPTION

For a more complete understanding of the invention reference is made to the drawing wherein;

FIG. 1 is a perspective side view of one embodiment of the improved air filter unit;

FIG. 2 is a perspective exploded side view of the components of the air filter unit of FIG. 1;

FIG. 3 is a perspective end view of the outer sleeve shown in FIG. 2 and showing in phantom lines the blank from which the sleeve is formed;

FIG. 4 is an enlarged fragmentary sectional view taken along line 4—4 of FIG. 3;

FIG. 5 is an enlarged fragmentary perspective view of a section of the outer sleeve and showing a portion of the seam formed therein.

Referring now to the drawing and more particularly to FIGS. 1 and 2, an improved air filter unit 10 is shown which is adapted for use on internal combustion engines for heavy duty trucks and the like. The unit is adapted to be placed within a suitable housing, not shown, which is normally located on the tractor section of a semi-trailer truck outside the hood thereof, the latter sometimes referred to as a bonnet.

As seen in FIG. 2, the unit 10 includes an inner sleeve 11; an air filter medium 12 of fiber-glass or like filtering material; an outer sleeve 13; and a pair of end plates 14, 15. The sleeves 11, 13 are preferably formed from a blank B (FIG. 3) of a foraminous material (e.g. expanded sheet metal or perforated sheet material). The periphery of the blank is initially formed of jagged, burr-forming portions. In the forming of each sleeve from the blank B, which has a rectangular or square configuration, one elongated burr-forming peripheral edge portion of the blank is folded back upon itself so as to form a hem-like segment 16. Subsequent to the hem-like segment 16 being formed, the segment and the burr-forming peripheral edge portion 17 of the blank opposite the segment are brought together in an overlapping relation so that the blank assumes a cylindrical configuration with a seam S extending the length of the sleeve see FIG. 3 and 4. It is important that the peripheral portion 17 be disposed beneath or under segment 16 and that the folded back portion 16a of the segment be concealed between the remainder of the segment and peripheral portion 17. Thus, the exposed edge 16b of the hem-like segment 16 forming the seam includes no undesirable burrs or projections. Once segment 16 and peripheral portion 17 are in proper overlapped relation, they are retained in such relation by welding W or some other suitable well known method.

The filter medium 12 is provided with a central bore 12a which is sized to frictionally accommodate the inner sleeve 11. The outer sleeve 13 is sized to frictionally accommodate the filter medium 12. The sleeves and the filter medium normally have the same lengths.

Overlying the corresponding ends of the sleeves and filter medium and affixed to the outer sleeve is a pair of end plates 14, 15.-In the illustrated embodiment, the end plates are of like construction and each includes a peripheral flange 14a, 15a which is adapted to embrace and conceal the burr-forming peripheral portions forming the opposite ends of the outer sleeve 13. An inner flange 14b, 15b is provided which encompasses the opening 14c, 15c formed in each plate. The flange 14b, 15b is dimensioned so that it frictionally fits within the corresponding end of the inner sleeve 11. The peripheral flange 14a, 15a is affixed to the corresponding end of the outer sleeve by welding or some other suitable method well known in the art. Once the end plates are affixed to the outer sleeve 13, there is no jagged or burred edge portion of the sleeve blank exposed which might snag clothing or scratch or cut the arm or hands of the installer when inserting or removing the unit from the housing.

Other material besides expanded sheet metal may be utilized to form the inner and outer sleeves such as perforated sheets of metal or plastics. It is important that the material be bendable without breaking so as to form a cylinder and yet be possessed of sufficient stiffness so that the unit can be readily handled without becoming distorted. Furthermore, if desired, and depending upon the flow pattern desired through the unit, only one end plate may be provided with a center opening. The size and shape of the various components may vary from that shown and will depend upon the size and rating of the engine on which the filter unit is to be installed.

Thus, a simple, inexpensive air filter unit has been provided which is easy to manufacture and assemble and can be readily handled without injury to clothing or the hands and arms of the installer.

We claim:

1. An air filter unit for use with an internal combustion engine comprising an elongated filter medium; an elongated outer sleeve encompassing said filter medium; and end plates affixed to and overlying corresponding ends of said sleeve and filter medium, said outer sleeve having an elongated longitudinally extending external seam and being formed from a blank of relatively stiff, foraminous sheet material with the periphery thereof including burr-forming peripheral longitudinal portions and an elongated peripheral longitudinal portion folded back under upon itself to form a hem segment, said blank being formed into a cylindrical sleeve with the hem segment having the folded back portion thereof disposed on the interior of said sleeve and overlapping and being affixed to a burr-forming peripheral longitudinal portion opposite said hem segment to form said elongated seam extending the length of said sleeve, the overlapped seam-foaming peripheral longitudinal portion being exposed only on an interior surface of the sleeve.

2. The air filter unit of claim 1 wherein the hem peripheral segment is affixed by welding to the overlapped seam-forming peripheral portion of the sleeve blank; the formed weld being substantially recessed from the exterior of said sleeve.

3. The air filter unit of claim 1 wherein the sleeve blank is of expanded metal sheet material.

4. The air filter unit of claim 1 wherein the foldback portion of the hem peripheral segment defines a substantially burr-less exposed foldline forming an elongated edge of the seam.

5. The air filter unit of claim 1 wherein the burr-forming peripheral longitudinal portions of said sleeve blank defining the ends of said sleeve are concealed by the end plates affixed thereto.

* * * * *